United States Patent [19]

Smeets

[11] Patent Number: 5,346,440
[45] Date of Patent: Sep. 13, 1994

[54] TRANSVERSE ELEMENT FOR A DRIVE BELT

[75] Inventor: Paul M. Smeets, Tilburg, Netherlands

[73] Assignee: Van Doorne's Transmissie B.V., Tilburg, Netherlands

[21] Appl. No.: 25,750

[22] Filed: Mar. 3, 1993

[30] Foreign Application Priority Data

Mar. 24, 1992 [NL] Netherlands .......................... 9200537

[51] Int. Cl.⁵ .............................................. F16G 1/22
[52] U.S. Cl. .................................................. 474/242
[58] Field of Search ..................... 474/237, 240–244, 474/201

[56] References Cited

U.S. PATENT DOCUMENTS 4,617,007 10/1986 Miranti, Jr. et al. ........... 474/242 X
5,019,020 5/1991 Van Lith ........................ 474/242 X

FOREIGN PATENT DOCUMENTS 0098733 4/1989 Japan .................................. 474/242

Primary Examiner—Thuy M. Bui
Attorney, Agent, or Firm—Young & Thompson

[57] ABSTRACT

Transverse element for a drive belt of the kind in which transverse elements whose principal planes rest against each other are fitted displaceably on one or more supports. The transverse elements are provided with one or more supporting surfaces for the support(s), the supporting surface being profiled at least in the direction transverse to the principal planes of the transverse element. The supporting surface is profiled in such a manner that a resultant force, which is to be exerted by a support on the transverse element, essentially engages outside the center of the supporting surface delimited by the principal planes. Stable positioning of the transverse element in the pulleys is thereby obtained, slipping and wear are reduced and efficiency increased. Specifically, the crest of the supporting surface is laterally offset.

19 Claims, 2 Drawing Sheets

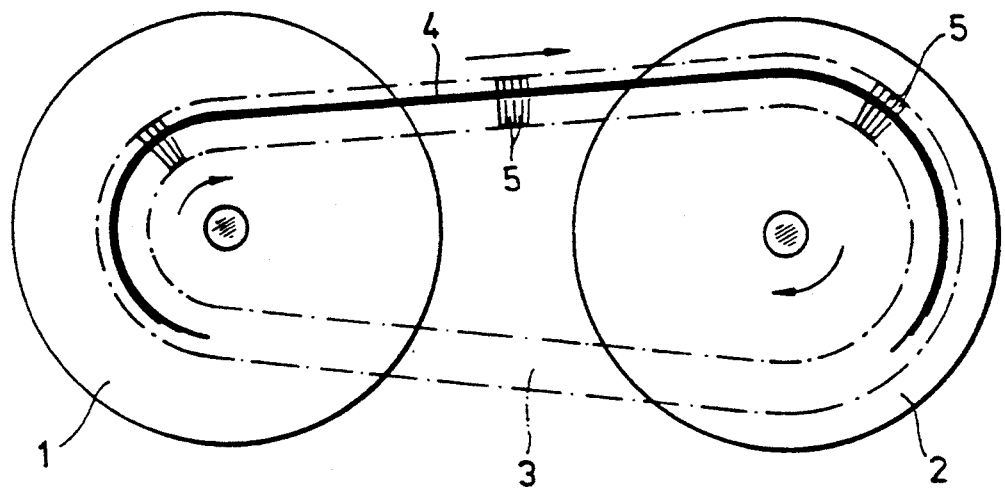
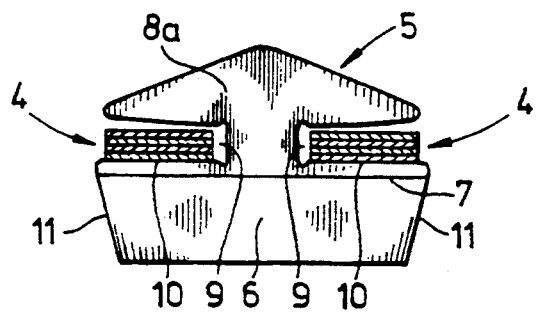
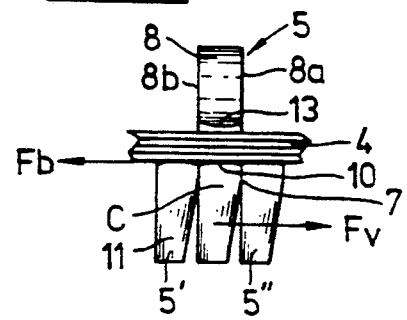
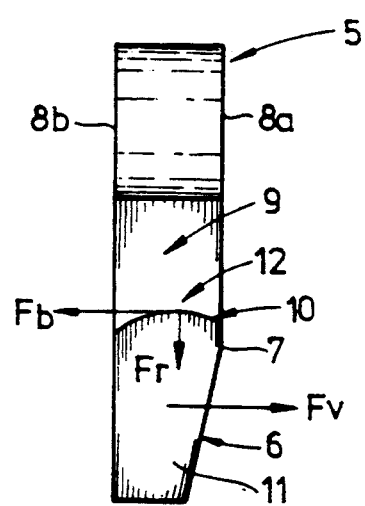
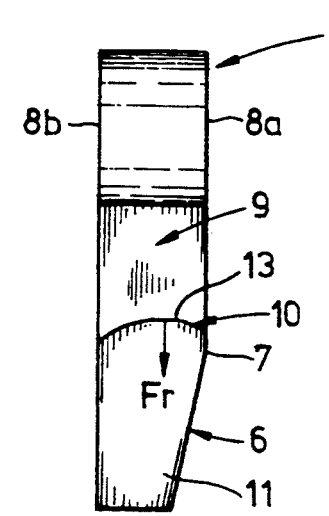
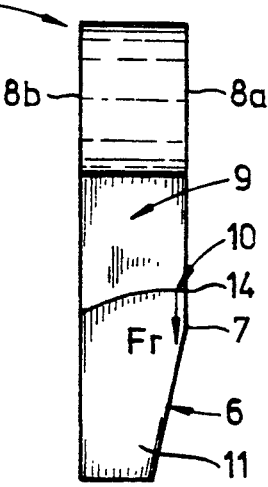

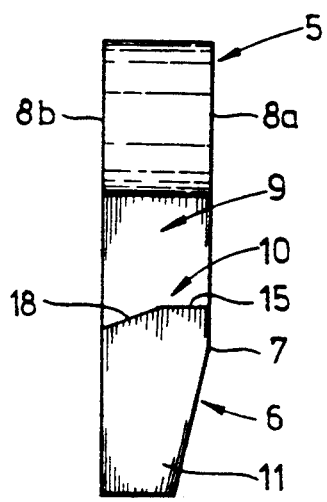
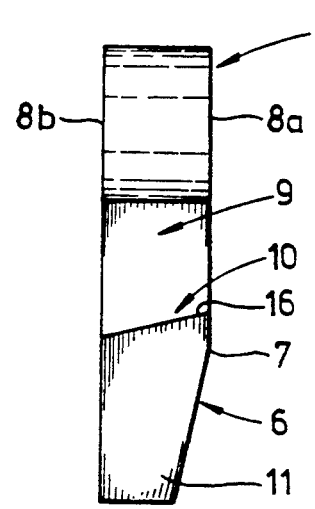
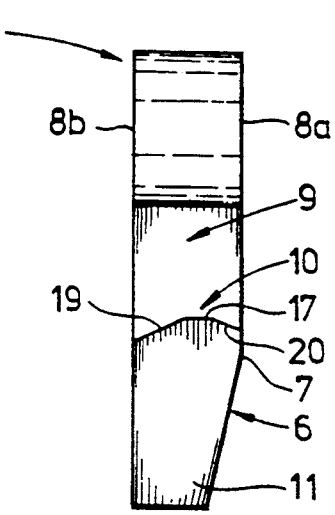
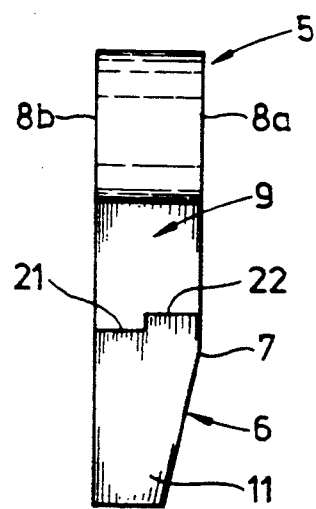
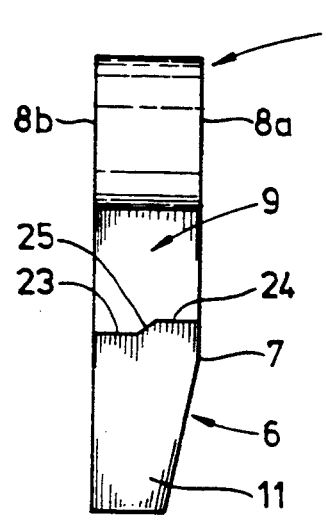
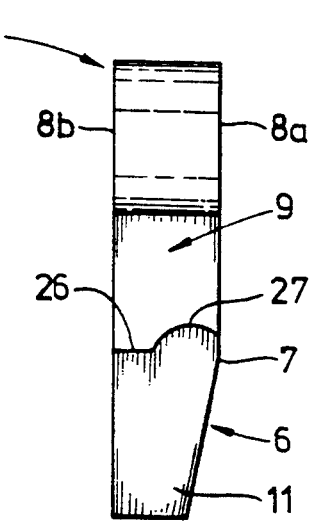

TRANSVERSE ELEMENT FOR A DRIVE BELT

The invention relates to a transverse element for a drive belt of the kind in which transverse elements whose principal planes rest against each other are fitted displaceably on one or more supports, provided with one or more supporting surfaces for the support(s), and in which the supporting surface is profiled at least in the direction transverse to the principal planes of the transverse element.

Such a transverse element for a drive belt is disclosed in GB Patent 2,013,116. The drive belt is used, in particular, in a continuously variable transmission in which the drive belt is used as the transmission means between the pulleys thereof. A drawback of said known transverse element is that, when it is clamped between the pulleys, it tilts slightly, which leads to slipping and consequently the efficiency of the transmission decreases and the wear increases.

The object of the invention is to overcome the above-mentioned disadvantage and to provide a transverse element which remains more stably positioned when it is clamped between the pulleys and is less inclined to tilt.

The transverse element according to the invention is characterised in that the supporting surface is profiled in such a manner that a resultant force, which is to be exerted by a support on the transverse element, essentially engages outside the centre of the supporting surface delimited by the principal planes.

As a result of this, an improved distribution of forces on the transverse element is achieved when the transverse element is clamped between the pulleys, said transverse element remaining more stably positioned and being less inclined to tilt. Slipping of the transverse element in the pulleys is reduced and the efficiency of the transmission increases. Furthermore, the wear of the transverse element and the pulleys decreases. This measure may optionally be implemented for both operating directions of the drive belt.

According to a more specific development of the invention, the supporting surface is profiled in such a manner that the resultant force in the main operating direction of the transverse element engages before the centre. In practice, the continuously variable transmission together with the drive belt incorporated therein will be operated more frequently in the forward direction and less frequently in the reverse direction. In this connection, the use of the continuously variable transmission in vehicles, such as cars, may be mentioned.

By allowing the resultant force in the main operating direction of the transverse element to engage before the centre of the supporting surface, a more stable positioning of the transverse element is obtained for the main operating direction of the drive belt.

According to further embodiments of the invention, the profile may be curved, convex, concave, bevelled or stepped. According to a more specific development of the invention, the top of the supporting surface is fitted outside the centre of the supporting surface delimited by the principal planes, in particular at the boundary of the supporting surface and a principal plane of the transverse element. The top may furthermore be flattened. Such profiles and an eccentric top are easy to apply from the point of view of machining and can often be combined with other necessary operations so that the improved transverse element according to the invention can be produced without appreciable further costs.

The invention will be explained with reference to the accompanying drawing. In this drawing:

FIG. 1 shows a diagrammatic side view of a continuously variable transmission;

FIG. 2a shows a front view of a transverse element according to the state of the art;

FIG. 2b shows a side view of a transverse element according to the state of the art, in cross section, together with, partly shown, corresponding transverse elements;

FIG. 3a shows a side view of a transverse element according to the invention, in cross section, having a convex profile and an eccentric top;

FIG. 3b shows an element similar to that of FIG. 3a but in which the top is flattened;

FIG. 3c shows an element similar to that of FIG. 3a but in which the top is fitted at the boundary with the principal plane;

FIG. 4a shows a side view of a transverse element, in cross section, having a partly bevelled supporting surface and a flat top;

FIG. 4b shows an element similar to that of FIG. 4a but having a completely bevelled supporting surface;

FIG. 4c shows an element similar to that of FIG. 4a but having two bevelled parts in the supporting surface;

FIG. 5a shows a side view of a transverse element, in cross section, having a stepped profile;

FIG. 5b shows an element similar to that of FIG. 5a but having a bevelled connecting piece;

FIG. 5c shows an element similar to that of FIG. 5a but having a convex step.

The continuously variable transmission shown in FIG. 1 comprises two pulleys 1, 2 about which a driven belt 3 is trained. In this case, the drive belt comprises two supports 4 on which transverse elements 5 have been fitted displaceably. Incidentally, within the framework of the invention, drive belts having one or more than two supports can be used without problem.

The principal planes 8a, 8b of the transverse elements 5 (FIGS. 2a, 2b) bear against each other. Principal plane 8a is bevelled in a plane 6 at the radial inside of the drive belt 3 at a tilt zone 7. The transverse elements are provided with two recesses 9 for receiving the supports 4. The recesses 9 are partly delimited by the supporting surface 10 for the supports 4. In this case, the supporting surface is profiled convexly between the principal planes 8a, 8b (see FIG. 2b) and the top of the convexly profiled supporting surface 10 is in the centre between the principal planes 8a, 8b. The transverse element is furthermore provided with two conical flanks 11 for clamping between the pulleys.

The transverse elements 5 experience a forward force (Fv) at the conical flanks 11, in particular in the driving pulley 1. Because, in this case, the transverse elements 5 shift over the support 4, a reaction force (Fb), which is directed rearward, occurs at the supporting surface. When positioned in the pulley, the transverse elements 5, 5' bear against each other, in particular at the tilt zone 7. The forwardly directed force (Fv) on the conical planes and the rearwardly-directed force (Fb) on the supporting surface produce a moment on the transverse element 5, the centre (C) of which is approximately at the tilt zone 7 in the centre between the principal planes. As a result of said moment, the transverse element 5 will tilt slightly rearward and slip between the pulleys causing loss of efficiency and wear.

It has been recognised that, in the transverse element according to the invention, said moment can be counteracted by having the force (Fr) exerted by the support 4 on the supporting surface 10, in the radial direction of the drive belt, no longer running through the centre (C), but engaging outside the centre of the supporting surface. This is shown in FIG. 3a, in which the top 12 of the convex supporting surface 10 is shifted slightly in the forward direction. The resultant force Fr which is exerted by a support 4, which is to be received in the recess, on the supporting surface, thus acts in a direction which is opposite to the moment exerted by the forces Fv, Fb. Tilting of the transverse element 5 is thereby prevented and no slipping or excessive wear will occur. Incidentally, this effect can already be achieved by shifting the point of application of the force Fr and/or the top off centre by more or less than one tenth of a millimeter. Incidentally, in those instances where the forces Fv, Fr, Fb are mentioned, this refers to the resultant of the force of the pulley, which engages in a diffused manner, on the conical flank or the support of the supporting surface, respectively.

In the embodiment according to FIG. 3b, the top 13 is also slightly moved forward but also flattened.

FIG. 3c shows an embodiment in which the top 14 has its crest at the boundary with the principal plane 8a.

In the embodiment according to FIG. 4, the supporting surface 10 is at least partly profiled in a bevelled manner. In FIG. 4a, the bevelled plane 18 runs into the essentially flat top plane 15.

In FIG. 4b, the entire supporting surface 10 is profiled in a bevelled manner and the top 16 is at the boundary with the principal plane 8a.

In FIG. 4c, the flat top plane 17 runs into two bevelled planes 19, 20.

In FIG. 5, the supporting surface is designed as a stepped plane. In FIG. 5a, this consists of two planes 21 and 22, whereas, in FIG. 5b, the two planes 23 and 24 are connected by a bevelled plane 25.

Finally, FIG. 5c shows an embodiment having a plane 26 and a convex plane 27.

It will be obvious that the invention is not limited to the embodiments shown but that various alternatives are conceivable within the scope of the invention. Thus, the measures according to the invention can be applied at the same time for moving the drive belt both in the forward and the rearward direction. In most cases, however, the application of measures only for the main operating direction, i.e. the forward direction, may be sufficient. Also, the transverse elements do not necessarily have to be designed with so-called stud/recess means for their mutual coupling.

I claim:

1. Transverse element for a drive belt of the kind in which transverse elements whose principal planes rest against each other are fitted displaceably on one or more supports, provided with one or more supporting surfaces for the support(s), which supporting surface is profiled at least in the direction transverse to the principal planes of the transverse element and has a supporting surface center which lies at equal distances from the principal planes, the supporting surface being profiled in such a manner that a resultant force, which is to be exerted by a support on the transverse element, essentially engages outside the supporting surface center.

2. Transverse element according to claim 1, wherein the supporting surface is curved.

3. Transverse element according to claim 2, wherein the supporting surface is at least partly concave.

4. Transverse element according to claim 2, wherein the supporting surface is at least partly convex.

5. Transverse element according to claim 4, wherein the top of the convexly curved supporting surface, in the main operating direction of the transverse element, is fitted before the center of the supporting surface.

6. Transverse element according to claim 1, wherein the supporting surface comprises at least a bevelled part.

7. Transverse element according to claim 1, wherein the supporting surface is at least partly stepped.

8. Transverse element according to claim 1, wherein the top of the supporting surface is fitted outside the center of the supporting surface delimited by the principal planes.

9. Transverse element according to claim 1, wherein the drive belt has a main operating direction, and the supporting surface is profiled in such a manner that in said main operating direction the resultant force engages before the supporting surface center.

10. Transverse element according to claim 1, wherein the top is positioned at the boundary of the supporting surface and a principal plane of the transverse element.

11. Transverse element according to claim 1, wherein the top is flattened.

12. A drive belt provided with a plurality of transverse elements whose principal planes rest against each other, said transverse elements being fitted displaceably on at least one support, each said transverse element being provided with at least one supporting surface with the support, each said supporting surface being profiled at least in a direction transverse to the principal planes of the transverse element and having a supporting surface center which lies at equal distances from the principal planes, the supporting surface being profiled in such a manner that a resulting force, which is to be exerted by a support on the transverse element, essentially engages outside the supporting surface center.

13. Transverse element for a drive belt of the kind in which transverse elements whose principal planes rest against each other are fitted displaceably on at least one support, the transverse element having a supporting surface for the support, said supporting surface having a crest which is closer to one said principal plane than to the other said principal plane.

14. Transverse element according to claim 13, said crest being spaced from said one principal plane.

15. Transverse element according to claim 13, said crest being at said one principal plane.

16. Transverse element according to claim 13, said supporting surface being convexly rounded at said crest.

17. Transverse element according to claim 13, said support surface being flat on at least one side of said crest.

18. Transverse element according to claim 13, said supporting surface being flat on opposite sides of said crest.

19. Transverse element according to claim 13, said crest being flat and perpendicular to said principal planes.

* * * * *